United States Patent

[11] 3,628,307

[72] Inventors  William Herbert Croasdale
               Morris Plains;
               Donald Owen Johnson, Matawan, both of N.J.
[21] Appl. No. 31,169
[22] Filed      Apr. 23, 1970
[45] Patented   Dec. 21, 1971
[73] Assignee   American Can Company
                New York, N.Y.

[54] CONTAINER CAPPING APPARATUS
     18 Claims, 14 Drawing Figs.
[52] U.S. Cl. ........................................... 53/299,
                                             53/303, 53/307
[51] Int. Cl. ........................................... B65b 7/28
[50] Field of Search ................................ 53/299,
                                             302, 303, 304, 307

[56] References Cited
     UNITED STATES PATENTS
     3,422,597  1/1969  Beer ........................ 53/307 X
     3,282,025  11/1966 Amberg et al. ............ 53/299 X
     3,509,682  5/1970  Logemann ................. 53/307 X Primary Examiner—Travis S. McGehee
Attorneys—Robert P. Auber, George P. Ziehmer and Leonard R. Kohan ABSTRACT: The invention is directed to apparatus particularly adapted for securing coverings or lids upon containers primarily used for storage of generally perishable goods. The lids are supplied to a rotary element upon which they are held in a temporary or quasipermanent location to be transferred at appropriate later time periods individually to loaded containers moving along a conveyor line to an outlet region. The loaded containers are carried along a conveyor which is moved in step-by-step fashion prior to and following loading. Both the loadings and the lid coverings are applied during conveyor movement arrest periods. Provisions are made for coordinating all of the container loading operations, the movements of the covering elements, and the rate of advance of the container both prior to and subsequent to a loading or takeoff. Various means may be provided for achieving the foregoing results including the use of vacuumlike grippings and the positioning of the container relative to a plungerlike element to discharge the container covering and then to transfer it to the container proper.

INVENTORS
WILLIAM HERBERT CROASDALE
DONALD OWEN JOHNSON
BY *Leonard R. Kohan*
ATTORNEY

FIG.5

INVENTORS
WILLIAM HERBERT CROASDALE
DONALD OWEN JOHNSON
BY
Leonard R. Kohan
ATTORNEY

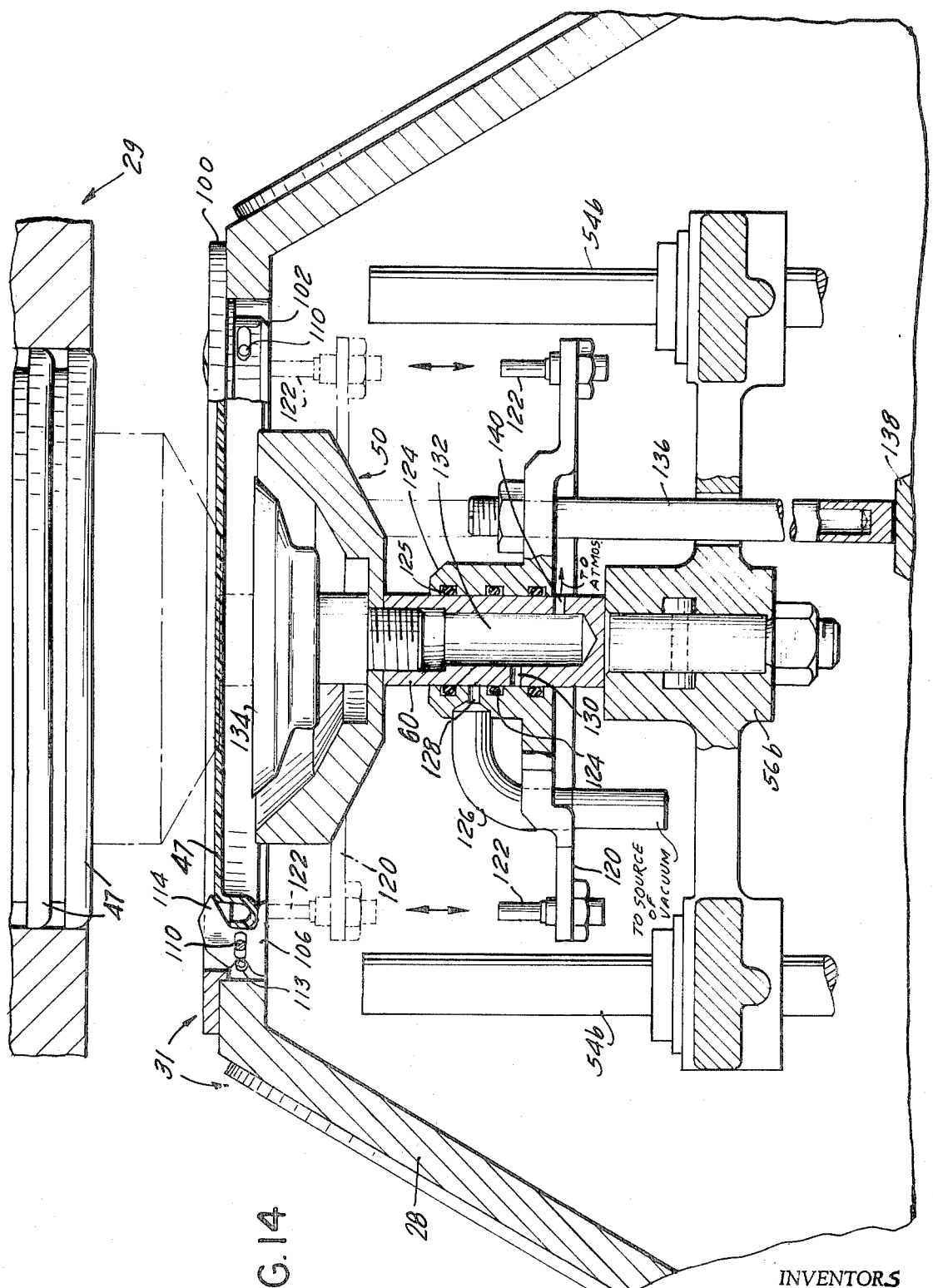

CONTAINER CAPPING APPARATUS

This invention is directed to a machine and apparatus adapted to apply closure caps to previously loaded cartons or containers.

Various ways and means have heretofore been known and used for capping containers or cartons into which either or both solids or liquids have been deposited prior to the capping operation. In such machines it is customary to provide ways and means by which cartons or containers after having been suitably formed and loaded may be capped at some suitable point. Many delays and inefficiencies of such previously known ways and means have been experienced. Further than this, in the past it has been difficult to insure that the capping apparatus will adapt itself to different sizes of containers without modification. Still further, the prior art devices have not provided an effective container capper suitable for the rapid operation required in the commercial markets of the present day.

As the invention will herein be described, it will be set forth in one of its particular preferred forms, although it should be understood that this will be merely illustrative of one embodiment of the invention.

By the present invention reference will be made to packaging items which are usually filled into any suitable type of plastic or cardboard form of container which must be capped prior to distribution and selling at outlet points.

In this operation the containers into which the products for sale are to be loaded are usually supplied in a step-by-step fashion at some loading point whereat, from a large supply source, a limited quantity of the filling material or articles is automatically placed within the then topless container. While it is not a specific part of the invention, many and various ways to establish the quantity of goods placed in the container are available, included among which are those of mechanisms serving to stop the feed when the entering supplies reach the full weight, volume, or quantity. Any predetermined optimum quantity, weight, or volume determines the feed. Any alternative filling process provided by a pressure or weight system when the feed is through any known size outlet may provide the control units which serve to stop the supply at known periods which could be of duration sufficiently long to fill a container to a desired extent. Many and other various forms of filling arrangements can be provided.

The subsequent part of the filling operation with which this particular invention is directly concerned should be understood as involving an operation by which the container is capped or topped by means of a mechanism which is positioned in cooperative relationship to some suitable conveyor for the moving of the containers. Motion of the containers along the conveyor normally is arrested momentarily during both the filling and capping periods. These periods are coordinated in timed relationship so that the container is first filled and then moved through one or more steps until it travels to a suitable capping position.

The particular invention which is here to be described deals mainly with ways and means to provide for capping or covering previously filled containers. As already noted, the capping operation is coordinated with the container movement following its loading. By this, it should be understood that the complete capping operation is completed within each time period that coincides with or is even slightly less than that allotted to the container filling at a prior point in the operation.

In its preferred form the capping mechanism withdraws one of a multiplicity of stacked container tops from a supply stack or hopper and then holds such top securely to move it at an appropriate time to a position above the loaded or filled container to which it is to be secured. Following this type of movement, the cap or covering, after being automatically placed immediately above the loaded container, is subjected to the operation of a suitable plunger or ram mechanism which functions to press such cap downwardly upon the container until a tight securement is achieved between the top and the container.

By this invention the caps are stacked in an array which generally corresponds to a hopper and the lowermost cap is withdrawn from the stack for each individual capping step, while all other caps of the supply are held in a removable position so that as each operational step of the conveyor drive occurs successive containers will be capped. The caps are initially released one by one and brought to rest within and adjacent to cap-holding regions upon a drumlike unit. The hopper for holding a supply of caps has a release mechanism, not part of the invention and not shown, for releasing one cap at a time from the hopper stacks. Such a release mechanism is disclosed in copending application Ser. No. 25,868. The drumlike unit rotates in a step-by-step fashion coordinated in its angle of movement with the step-by-step movement of the conveyor upon which the loaded carton or containers are carried. The top or covering from the supply or hopper which is placed adjacent to the drumlike unit to transport it to the loaded carton or containers is initially permitted to fall into the cap-holding region which, incidentally, is normally at the top side of the rotary cap-carrying drum.

The holding region of the drum has holding rings of a size and shape similar to that of the cap which is to be placed upon the container as its closure element. As the holding rings on the drums may be readily replaced the drum can be changed to handle container caps of various sizes by attaching holding rings of the desired size to the drum. The holding ring is provided with a multiplicity of pawl-type gripping elements appropriately spaced along the peripheral edge of the holding region. Before the time a cap is removed from the stack and permitted to move into the holding region, the pawl-type gripping members are all turned to an open position to receive the cap. A plunger element is then moved through the holding ring to a position where it is in direct contact with that surface of the cap, which surface will be the outside surface after the cap is applied to the container. With this occurring, provision is made for securely engaging the cap with the end of the plunger by the creation of a vacuum which is obtainable in certain selected positions of the turret and plunger. Control mechanisms open a connection to suitable conduits or tubes leading to a vacuum pump which reduces the pressure adjacent to the cap to some valve below atmospheric which is sufficient to hold the cap tightly against the plunger. The plunger element then moves back through the holding ring whereupon the pawls engage the cap and rotate to the closed position.

The turning action of the pawls through an appropriate angle serves to move the pawl to a closed position where the cap is held tightly within the holding ring. This closed position of the pawl is then maintained by spring pressure so that the cap is securely located within the holding region between the loading time and that when it is released to cap the container.

With this operation having occurred, the plunger and vacuum cup are withdrawn interiorly of the drum which continues to rotate in its step-by-step fashion. Then another holding ring of the drum which is adapted to hold a cap next released is turned or indexed to a similar position where the caps are released to the drum at a region directly above that where the loaded or filled container or carton is to be capped. Here it might be emphasized that the peripheral step-by-step movement of the drum is such that its rotation and path of arcuate movement for each rotational stop corresponds to that of each step movement of the conveyor carrying the loaded cartons.

As the drum is indexed, the holding rings insure that each carton top is carried to its lowermost or capping position which is diametrically opposite the cap loading position. When this occurs the cap is ready for separation from its holding ring at a location directly above the already filled container. A suitable plunger or piston is arranged to move outwardly through the holding ring above the container for superimposing the cap upon the top of the loaded container. The outward movement of the plunger disengages the cap from its holding pawls by an outward pressure exerted upon it of sufficient magnitude to rotate the pawls to an open position. The plunger then presses the cap onto the top of the container.

As soon as the mating operation between the cap and container occurs, the plunger is retracted into the drum, and the drum continues its rotation in the step-by-step fashion for repetitions of the desired operations.

With the general description of the operation of the device it will become apparent that one of the main objectives of the invention is that of providing a simplified construction adapted for securely capping loaded container or carton components.

A further object is that of providing a unique cap applicator having an indexing turret and movable plungers for transporting a cap from a supply stack to a position over a loaded container and then placing the cap on the container.

A further object is that of coordinating container loading, capping and discharge.

An additional object of this invention is to provide a unique holding ring for receiving, transporting and discharging container caps.

Other objects and advantages will become apparent and suggest themselves from a reading of the following description and the drawing wherein:

FIG. 5 is another side view of the drum-type cap applicator with portions broken away for clarity of illustration of the internal operating mechanism for removing caps from a supply stack and placing the container caps on the containers proper.

Figure 10:
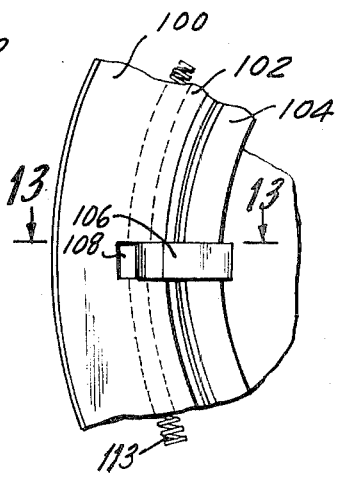
FIG. 10 is a greatly enlarged partial view of a portion of the container cap-holding mechanism of FIG. 9 illustrating a pawl in the open position for receiving a container cap.
Figure 11:
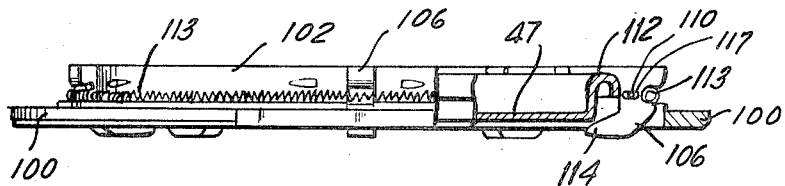
FIG. 11 is a partial sectional view taken generally along line 11—11 of FIG. 9 illustrating the pawls in the closed position with a container cap secured therein.
Figure 12:
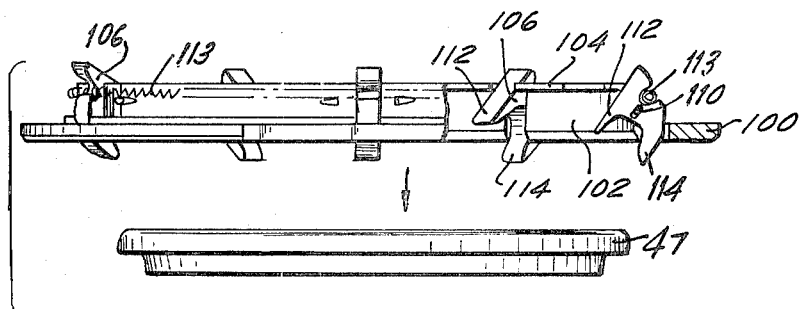
Figure 13:
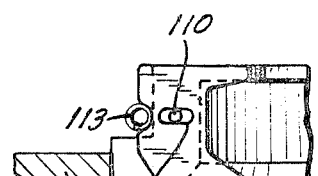

FIG. 12 is a view generally similar to FIG. 11, but showing the pawls rotated to the open position after the release of the container cap which is shown immediately below the ringlike cap holding mechanism; and FIG. 13 is a partial sectional view taken along line 13—13 of FIG. 10 particularly illustrating the resilient means for holding a pawl in place and showing the slidable adjustment of the pawl to accommodate oversize caps.

Figure 4:
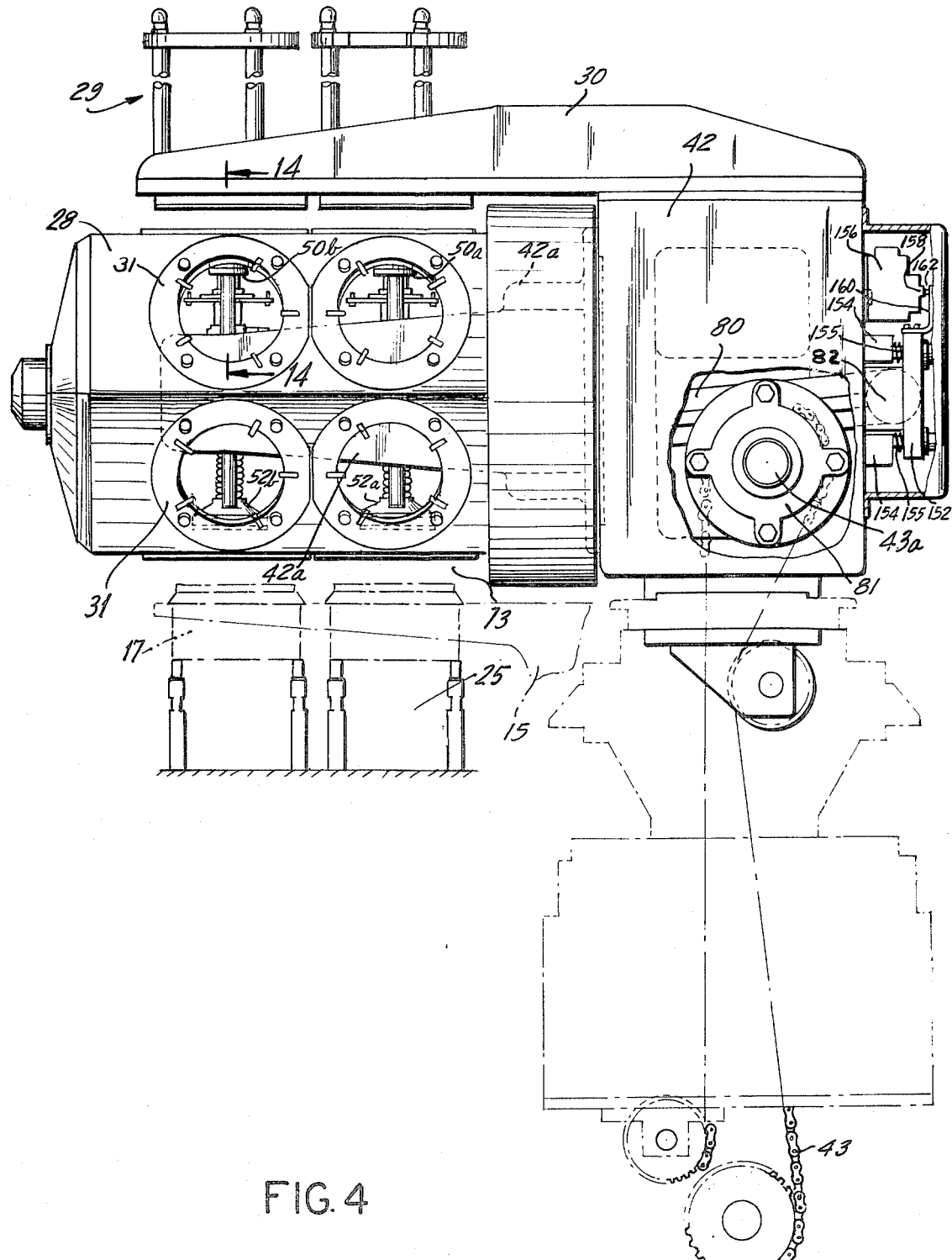
FIG. 4 is a side view of the drum-type applicator with parts broken away for clarity of illustration.

FIG. 14 is an enlarged sectional view taken generally along the line 14—14 of FIG. 4 illustrating the container cap suction cup and the mechanism for establishing a vacuum at its contact region with the lowermost cap of the supply stack, thereby to effectively grip the cap and transport it from the stack to the holding region of the drum.

Figure 1:
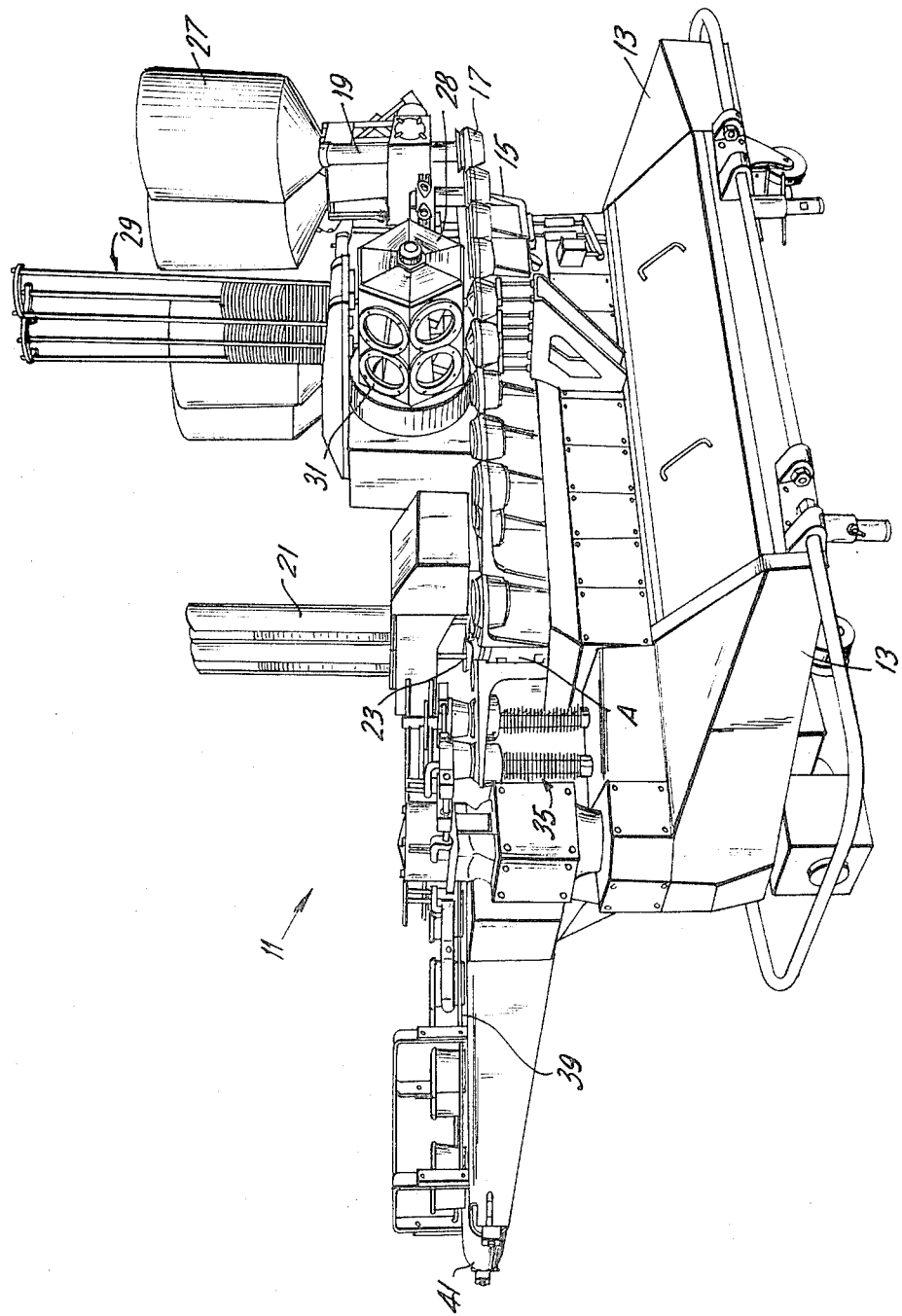
FIG. 1 is a perspective view of the complete container loading apparatus.

Now making reference to the drawings, and particularly the features illustrated in FIG. 1, the capping machine, indicated generally by the numeral 11, comprises a base member 13, wherein there is included a suitable drive mechanism (not shown) for its various components which are herein to be described. The mechanism as a whole includes an endless conveyor 15, having a series of pairs of openings therein for receiving pairs of containers 17 which are filled in sequence from supply tubes 19. Although the drawings disclose the simultaneous capping of pairs of containers, for clarity the following description generally will be limited to an explanation of the capping of a series of single containers on the conveyor 15.

The containers 17 are supplied to the conveyor 15 from a stack 21, and each loaded into one of the openings on the endless conveyor belt by means of the plunger 23. No drive mechanism for the endless conveyor is shown, but it will be understood that this conveyor is shown, but it will be understood that this conveyor, as it is seen from FIG. 1, moves in the foreground in the direction from right to left, which would, of course, provide clockwise rotation, looking down upon the mechanism as a whole.

It will be apparent from what is to follow that when containers are so located on the conveyor and then moved in a step-by-step fashion, thereby providing a brief interruption in movement between any two successive points, the loading and capping can be achieved at selected points when movement is interrupted by the appropriate drive mechanism. The preferred form of this invention described and illustrated herein uses a step-by-step drive providing brief interruptions in movement. However, it should be understood that the invention described herein can also be adopted for continuous drive. The principal features of this invention are the method and apparatus by which the unique capping operation is achieved.

The invention as illustrated is a form particularly adapted to the packaging in containers of food items, such as cottage cheese. Such items are supplied from tanks or hoppers shown at 27, whose output is adapted to feed down into the containers 17 through the outlet supply tube 19. The extent of the feed may be determined by conventional devices so that an adequate amount may be placed within each container during the extremely short time of the interruption of the step-by-step conveyor movement, after which the filled containers are capped and sealed for shipment. Since the discharge of the containers after they have been filled and capped is not specifically a part of the present invention, it will be understood that any suitable form of discharge mechanism can be utilized.

Following the loading of each container 17 from the supply tanks 27, the endless conveyor belt 15, in its intermittent or step-by-step drive fashion, moves the containers to a position immediately below a turret-type cap applicator or drum 28, which is driven to rotate or index in a step-by-step fashion. For illustrative purposes, this drum element 28 is shown as being of hexagonal end peripheral shape with flat sides. The drum, in effect, forms a conveyor arrangement for effecting the transportation of the caps from a supply source to the containers 17 as they move along the conveyor. The caps are supplied from a stack or hopper 29, from which they are withdrawn individually to a holding ring represented generally at 31, on the drum 28.

With the drum 28 of hexagonal shape, it can be appreciated that, upon turning it can be moved to positions where its upper surface is brought substantially parallel and adjacent to the lowermost cap held in the stack or supply hopper 29 mounted on the machine housing by a support 30. Simultaneously, the drum surface which is the momentarily lowermost, is positioned directly over the endless conveyor which had loaded but, as yet, uncovered, containers. With the conveyor moving in a step-by-step fashion, the individual caps from the supply hopper 29 are positioned in sequence in the holding rings 31 of the drum. A cap which had previously been positioned in the uppermost holding ring 31 is indexed to the lowermost drum position to bring it parallel to the conveyor in its step-by-step movement. This positioning occurs while the drum and the conveyor are each momentarily held stationary at a time coinciding with the container filling. By proper design the holding ring can be precisely aligned with the conveyor so that at the time of conveyor stoppage a cap is positioned directly over a loaded container.

When this latter action occurs, an advantageously designed mechanism contained with the drum, and later to be described, functions to disengage the previously gripped and held cap and discharge it onto the top of the container after which the cap is pressed downwardly onto the container so that it becomes securely attached thereto.

Subsequent to these capping operations, the loaded and then capped containers move along with the conveyor until a transfer position marked "A" is reached. At this position a lifting element 35 grasps each container as it is moving along the conveyor and lifts the loaded container from the conveyor and moves it to an unloading position where it is received by an endless belt 39 and moved to a discharge region 41. With the loaded container removed, the conveyor is then in a position to accept new unloaded cartons or containers from the supply stack 21 so that the already described operation can be repeated.

The drum 28 is of such size that each step portion of rotation (where a hexagonal drum is illustrated, this obviously is a 60° angle) moves the drum surface through an arcuate distance of turning coinciding with the travel of each container along the conveyor for each rotational step. Thus, at each position where there is an arrest of the conveyor motion a simultaneous arrest of the drum rotary motion occurs so that a lid is arranged to be discharged for securement to a container in precisely that position where the fit is most readily achieved.

Turrent Drum Driving Apparatus

Figure 3:
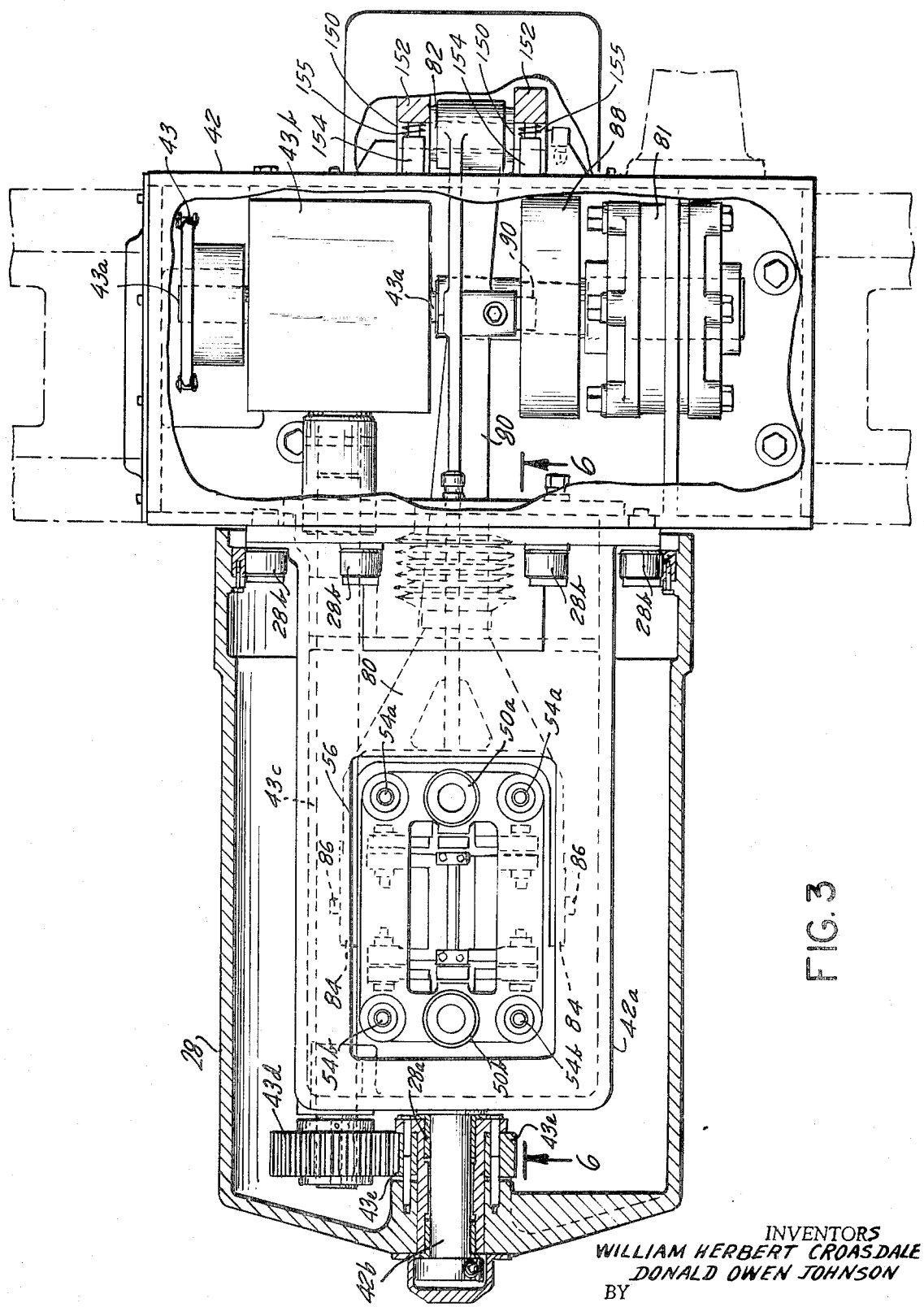
FIG. 3 is a top view of the drum-type cap applicator with portions broken away for clarity of illustration of the driving mechanism therein.
Figure 6:
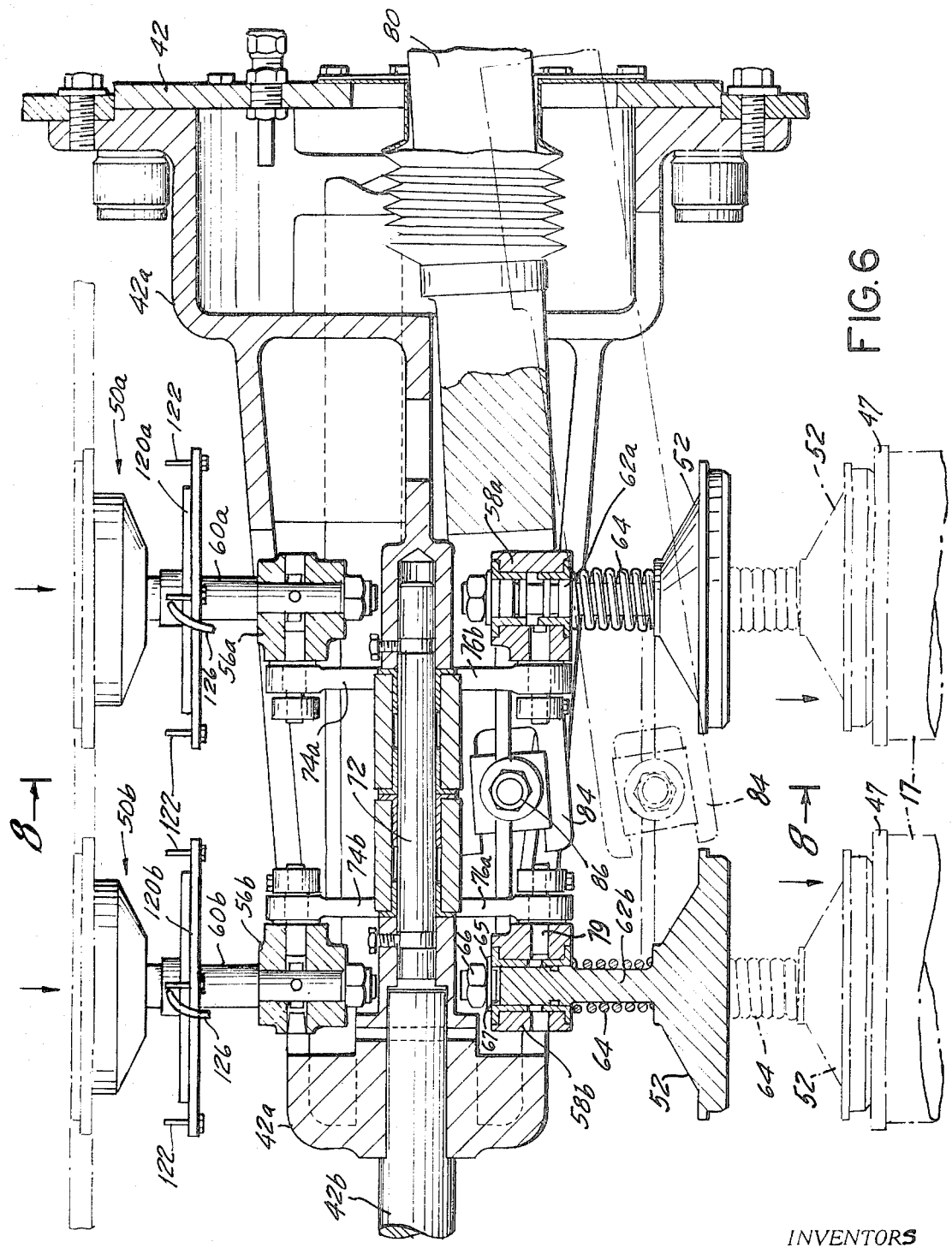
FIG. 6 is an enlarged sectional view of the applicator taken generally along line 6—6 of FIG. 3 with the rotating drum removed for clarity of illustration of details of the internal operating mechanism.
Figure 7:
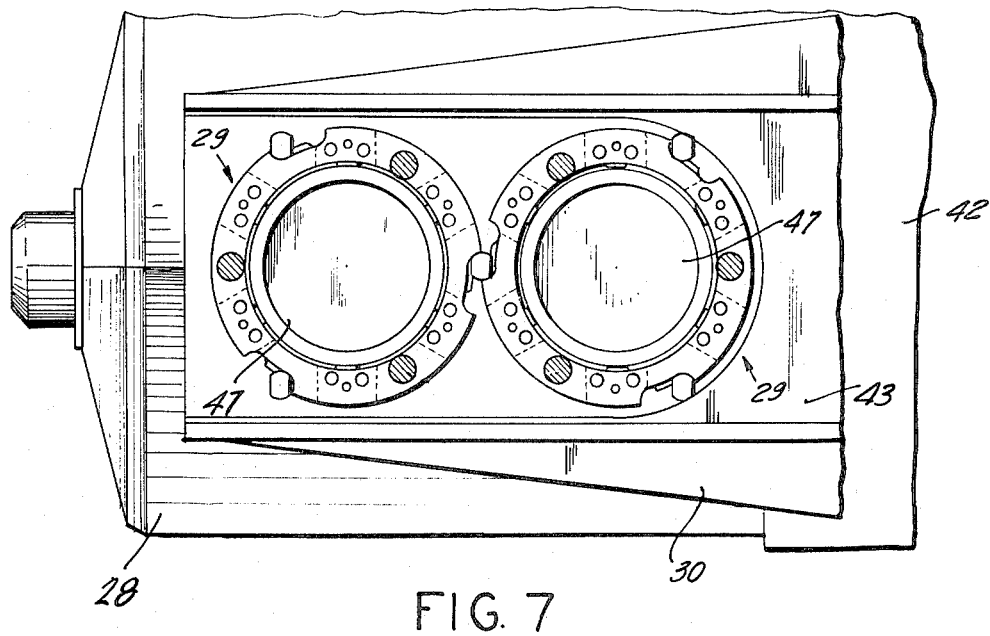
FIG. 7 is a partial top view of the applicator taken generally along the line 7—7 of FIG. 5 illustrating the hopper for disposing a supply of caps adjacent the drums.

By referring to FIGS. 3 and 6 of the drawings and the following description the highly advantageous structural elements of the drum driving mechanism will become apparent. In order to rotatably mount the drum 28, a machine housing 42 has rigidly mounted thereon a support or pedestal 42a with a fixed shaft 42b extending from the free end thereof. The drum 28 is supported on the pedestal 42a by means of a suitable bearing member 28a rotatably supporting the outer end of the drum on the shaft 42b. At its inner end, the drum is rotatably supported on its inner surface by rollers 28b mounted on the base of the pedestal. As may be seen from FIGS. 3 and 4, a chain drive 43 operates a continuously rotating shaft 43a which in turn drives a conventional indexing or intermittent motion mechanism 43b. The drum 28 is indexed by the intermittent motion mechanism 43b through a drive shaft 43c connected with the indexing mechanism 43b on one end and with the drum 28 on the other end. A gear 43b mounted on the outer end of the shaft 43c cooperates with a mating gear 43e mounted on the drum 28 adjacent the bearing 28a so that the drum may be indexed by the rotation of the shaft 43a.

Thus the drum 28 is adapted to be indexed by rotation of the drive shaft 43a about the fixed pedestal 42a whereby the holding rings 31 are sequentially positioned so that a cap 47 may be transferred from the cap supply hopper 29 to a holding ring 31 adjacent the hopper 29 and indexed in the holding ring 31 to a position adjacent the conveyor 15 where it is disengaged and placed on a container 17.

Cap Transfer Apparatus

The highly desirable mechanism for transferring the caps 47 to and from the holding rings 31 will now be described. The transferring mechanism illustrated in the drawing is for simultaneously handling a pair of caps for capping a pair of containers. However, it should be understood that the mechanism can be readily adapted to handle the capping of a single or a plurality of containers.

A suction pickoff cup mechanism, generally designated by the numeral 50, is movably mounted on the pedestal 42a within the drum 28 and is adapted to move upwardly through a holding ring 31 and engage a cap 47 in the supply hopper 29. The cup 50 then returns with the individual cap 47 through the holding ring whereupon the cap 47 is engaged by the holding ring 31 in a manner to be described hereafter. Simultaneously with the movement of the pickoff cup 50, a discharge cup mechanism 52 moves downwardly through the holding ring 31 positioned adjacent the conveyor 15, disengages a cap 47 therefrom and presses the cap onto a container 17 positioned thereunder.

Figure 5:
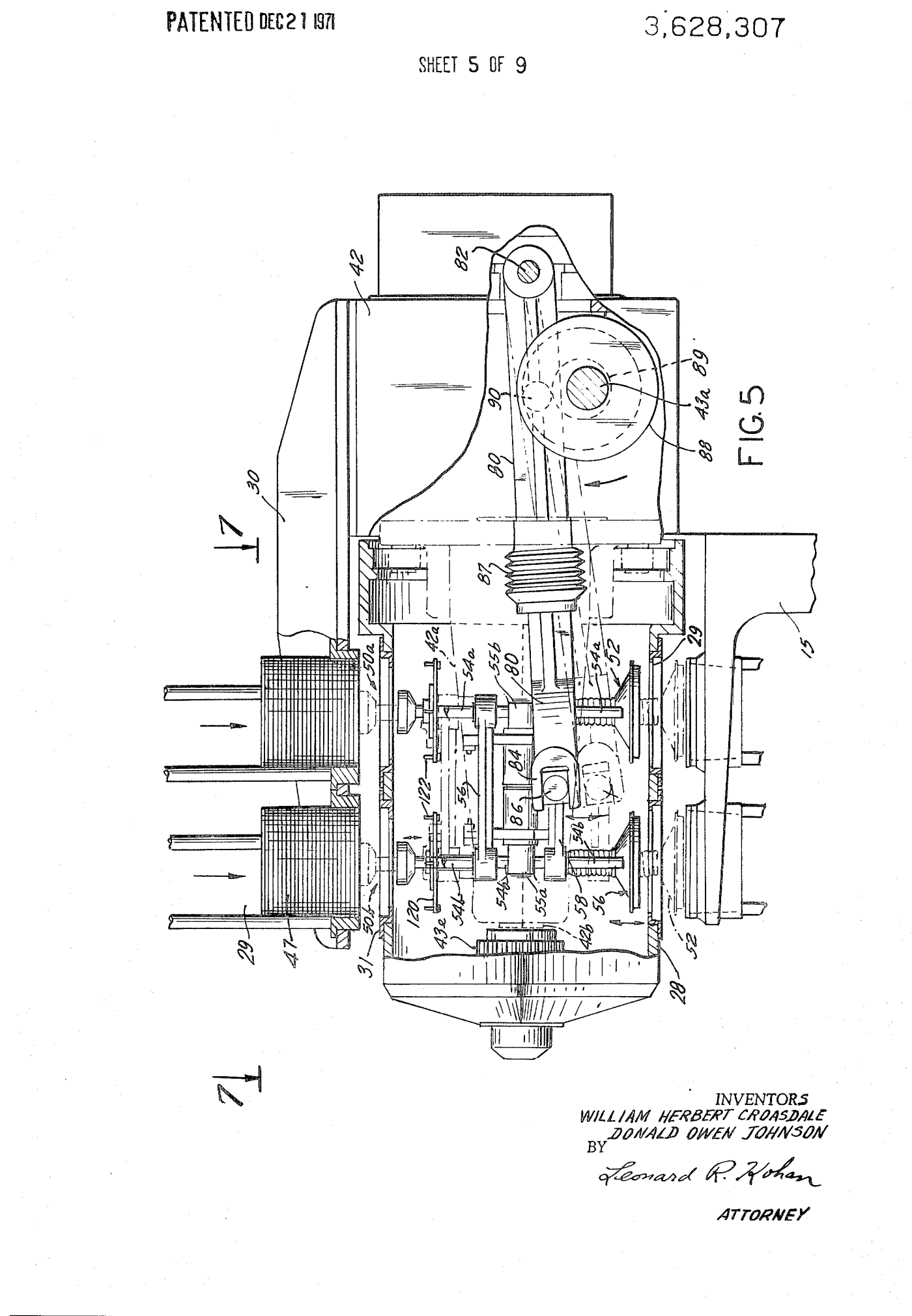
Figure 8:
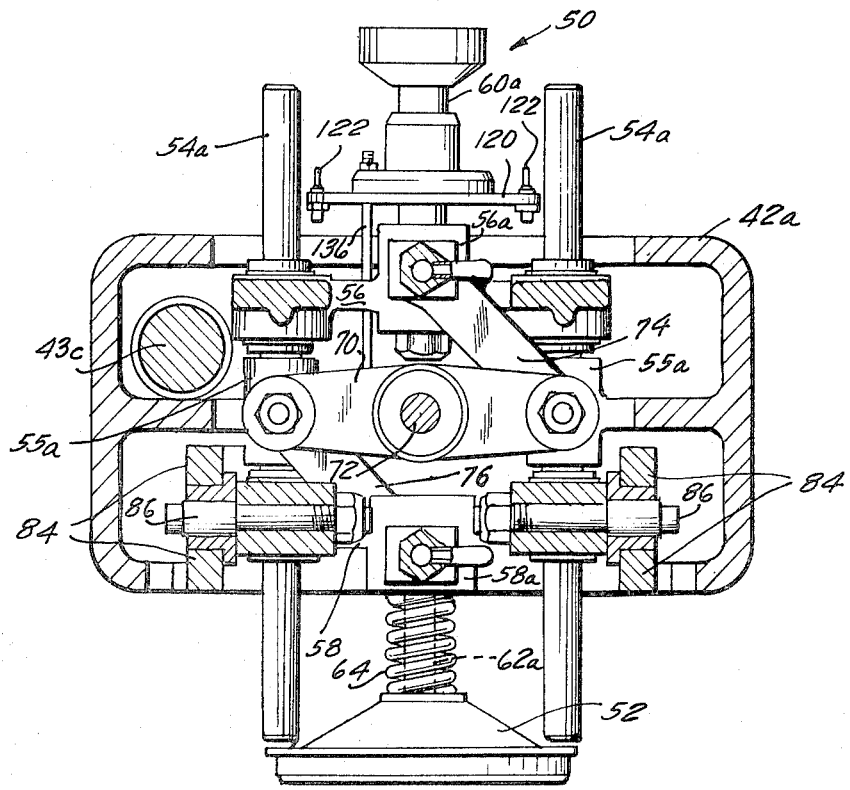
FIG. 8 is a sectional view of the applicator taken generally along line 8—8 of FIG. 6 for further illustration of the details of the internal operating mechanism.
Figure 9:
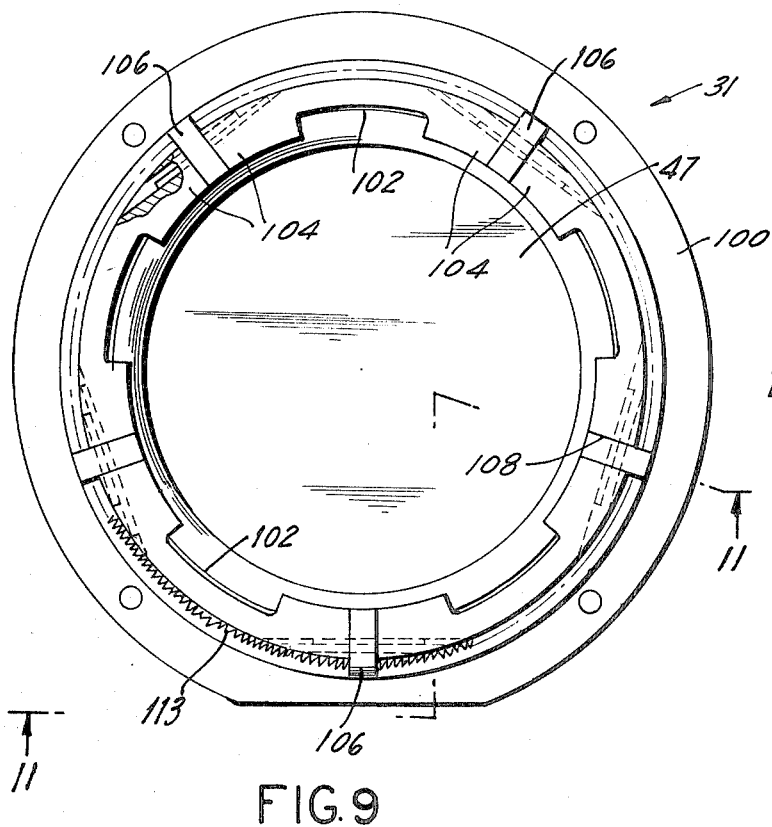
FIG. 9 is a plan view of the cap-holding ringlike mechanism located in the receiving region of the drum.

In order to provide for simultaneous movement of a pair of pickoff cups 50a and 50b and a pair of discharge cups 52a and 52b as may be readily seen in FIGS. 3, 5, and 8, a pair of parallel guide posts 54a and a second pair 54b are fixedly mounted on the pedestal 42a and extend upwardly and downwardly therefrom. The pair of parallel guide posts 54a are fixedly mounted on sleeve portions 55a of the pedestal 42a adjacent the inner group of aligned holding rings 31. Similarly the other pair of parallel guide posts 54b are fixedly mounted on sleeve portions 55b of the pedestal 42a adjacent the outer group of aligned holding rings 31. A generally rectangular upper support frame 56 is slidably mounted by suitable bushings on the four upper ends of the pairs of posts 54a and 54b. A similarly designed lower support frame 58 is slidably mounted by suitable bushings on the four lower ends of the pairs of posts 54a and 54b.

The inner end of the upper frame 56 has a tube 60a rigidly mounted thereon by means of a collar 56a positioned between the pairs of posts 54a. The outer end of the upper frame 56 also has a tube 60b rigidly mounted thereon by a collar 59b between the pairs of posts 54b. Similarly a pair of support shafts 62a and 62b having the discharge cups 52a and 52b attached to the lower ends thereof are mounted between the pairs of post 54a and 54b on collars 58a and 58b of the lower frame 58. The shafts 62a and 62b are resiliently mounted on the collars 58a and 58b in a manner to be described hereinafter. Accordingly, movement of the frames 56 and 58 will cause movement of the cups 50 and 52.

Simultaneous upward and downward movement of the cups 50 and 52 and the frame 56 and 58, is provided for by a pair of identical linkages disposed between the upper frame 56 and lower frame 58. One of the linkages is located adjacent the posts 54a and the other adjacent the posts 54b. As illustrated in FIG. 8, each linkage is provided with a two arm lever 70 pivotally mounted about a shaft 72 fixedly mounted on the pedestal 42a. One arm of the lever 70 is pivotally connected to one end of an upper link 74 and the other end of the upper link 74 is pivotally connected to the upper frame 56. Similarly the other arm of the lever 70 is pivotally connected to one end of a lower link 76, which in turn is pivotally connected to the lower frame 58. Thus, movement of the lower frame 58 will cause a similar movement of the upper frame 56 because of the connection through the links 70, 74, and 76.

In order to provide for the desired operational movement of the cups 50 and 52, as illustrated in FIG. 5, the lower frame is engaged by forked arm 80 which is pivotally mounted by a suitable bushing on the housing 42 on a fixed pivot pin 82. The forked end of the arm 80 extends about the lower frame 58 and is slidably attached thereto by a pair of yokelike U-shaped members 84 which fit about and slidably engage a pair of bearing pins 86 fixedly mounted on opposite sides of the lower frame 58. As may be seen from FIGS. 5 and 6, movement of the forked arm 80 from the position shown in solid line to the position shown in phantom line will cause upward and downward movement of cups 50 and 52.

The forked arm 80 is also driven by the continuously rotating shaft 43a which passes through the indexing mechanism, as shown in FIG. 3, and is supported by a bearing member 81 mounted on the housing 42. A cam member 88 is mounted on the shaft 43a adjacent the bearing member 81, and has an eccentric path 89 formed therein. The forked arm 80 has a follower 90 in the form of a roller which is disposed in the eccentric path 89 and is of suitable size to be engaged with the eccentric surfaces of the path 89 in the cam member 88. Rotation of the cam member 88 causes the forked arm 80 to be displaced in an up or down or vertical direction, as viewed in FIG. 5, relative to the drive shaft 43a. This displacement of the forked arm, as shown in phantom line in FIG. 5, causes the complex assembly including the frames 56 and 58 and cups 50 and 52 to move in opposite directions between their limiting positions whereby a cap is picked off the hopper 29 and placed in a holding ring 31 and another cap is disengaged from another holding ring 31 and placed on a container 17, on the conveyor 15.

The Holding Rings

Figure 2:
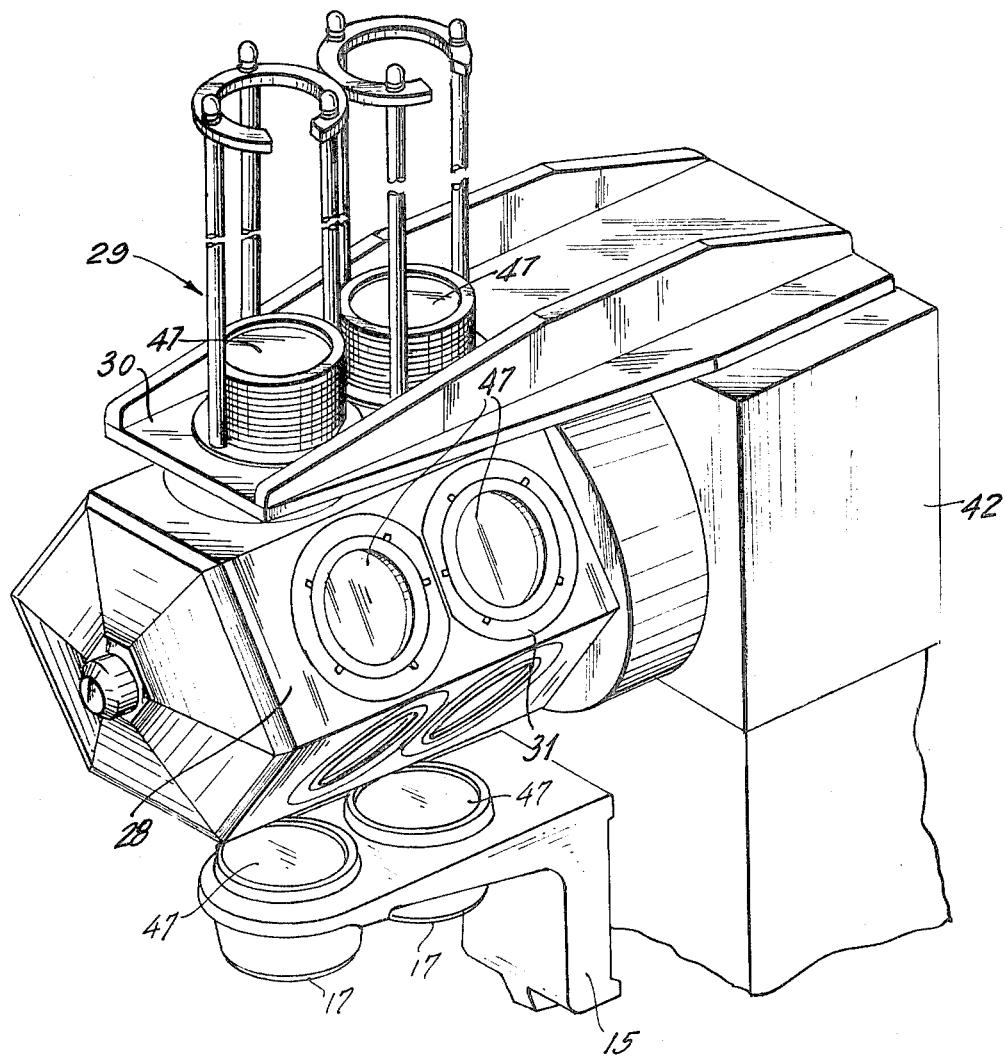
FIG. 2 is a perspective view of the turret or drum-type cap applicator portion of the machine illustrating the feeding of container caps to the applicator.

As illustrated in FIG. 2, the drum 28 has two adjacent sets of rings 31 providing pairs of cap holding elements for simultaneously capping pairs of containers 17 carried by the conveyor 15. The drum 28 being of hexagonal shape, each set of rings 31 has 6 rings 31 therein aligned for receiving pairs of caps 47 from the hopper 29 and for releasing pairs of caps 47 over containers 17 on the conveyor 15.

Referring now to FIGS. 9–13, each holding ring 31 has a washerlike base portion 100 which is secured to the drum 28 by conventional fastening means. A cylindrical rim portion 102, formed on the inner periphery of the base portion 100, extends inwardly toward the interior of the drum 28 and has a plurality of lip portions 104 extending radially inwardly from the cylindrical rim portion 102. The inner cylindrical surface of the rim portion 102 and the lip portions 104 form an annular seat for receiving and holding a cap 47.

In order to prevent the cap 47 from falling out of the holding ring 31 during the indexing of the drum, a plurality of retaining pawls 106 are provided on the rim 102. The pawls 106 are pivotally mounted on the ring 31 in radial slots 108 which extended inwardly from the inner periphery of the base 100 and rim 102 between the lip portions 104. Pivot pins 110 mounted on the rim 102 rotatably mount the pawls in the slots 108.

The pawls 106 are designed with a jawlike or U-shaped gripping portion having, when in the closed position, as illustrated in FIG. 11, a flange 112 which is contiguous with the lips 104, and a retaining finger 114 which extends over the annular seat of the ring 31 to hold a cap 47 therein. When the pawls 106 are in the open position, illustrated in FIG. 12, the U-shaped portion extends upwardly in a position to receive a cap 47. An annular retaining spring 113 fits about the outer cylindrical surface of the rim 102 and is disposed in notches 115 formed in the outer side of the pawls 106. The spring 113 applies a suitable bias to the pawls 106 causing the pawls 106 to remain set in the position they have been placed in, that is in either the open or closed positions.

When the discharge cup 52 passes downwardly through the ring 31, the cap 47 retained therein is disengaged as the pawls 106 are rotated from the closed position shown in FIG. 11 to the open position shown in FIG. 12. As the drum 28 is indexed, the pawls remain in the open position until the point in the cycle when the ring 31 is positioned under the hopper 29 and the pickup cup 50 again moves from the hopper 29 back through the ring 31 with a cap 47 whereupon the cap 47 is engaged by the U-shaped jaw portion of the pawls. The grip of the cup 50 on the cap 47 is sufficiently strong to cause the cap 47 to apply sufficient force against the pawl flange 112 to effect a rotation of the pawls to the closed position where the pawl fingers 114 securely hold the cap 47 in the ring 31. The cup 50 then becomes disengaged from the cap 47 and continues its downward movement.

The diameter of the annular cap seat formed by the ring 31 is usually slightly greater than the diameter of the cap which is to be applied to a container. The U-shaped portion of the pawls may extend radially inward slightly beyond the diameter of the annular seat formed by the rim 102 in order to effectively engage the caps. In order to handle an occasional oversize cap which has a larger diameter than the normal cap 47 for which the holding ring 31 is designed, the pawls have elongated bores 117 for receiving the pins 110. Normally, the spring 113 biases the pawls so that the pins 113 are positioned at the outer end of the bores 117. However, if an oversized cap is placed in the ring 31, because of the elongated bores 117, the pawls 106 are free to move radially outwardly against the bias of the spring 113 to accommodate the oversize cap 47.

The Suction Cup for Removing Caps from the Supply Hopper

To fulfill the twofold purpose of providing a vacuum connection for the suction cup 50 to enable it to effectively transport a cap 47 from the supply hopper 29, and for ensuring that the pawls 106 on the holding rings 31 are in the open position when indexed under the hopper 29, a disc 120 is slidably mounted on each of the support tubes 60 as illustrated in FIG. 14.

The pawls 106 are normally in the open position shown in FIG. 12 when a ring 31 is indexed under the hopper 29, however due to malfunctions it is possible for the pawls 106 to be in the closed position when so positioned, which occurrence would cause faulty capping of the containers.

In order to avoid this problem, the disc 120 has a plurality of cocking pins 122 around the peripheral edge thereof which are aligned and engageable with the pawls 106 on the holding ring 31. The disc 120 is slidably mounted on the tube 60 by means of a sleeve 124 which fits snugly about the tube 60 so that it will normally move along with movements of the tube 60. However, the sleeve 124 will slide on the tube 60 when its movement is arrested by a suitable stop. Upon an upward movement of the tube 60, if a pawl 106 is in the closed position, the cocking pin 122 will engage the flange portion 112 and rotate the pawl 106 to the open position. In addition, due to the fact that the pawls 106 are restrained from rotation beyond the open position shown in FIG. 12 because of engagement of the backside of the pawl 106 with the base 100, the upward movement of the pins 122 and the disc 120 are arrested.

With the upward movement of the disc 120 arrested, the support tube 60 continues to move upwardly by sliding within the sleeve 124. As this occurs a vacuum tube 126 communicating with a conventional vacuum producing mechanism (not shown) is connected to the sleeve 124 at port 128 leading to the interior of the sleeve 124. As the tube 60 moves upwardly within the sleeve 124 a vacuum port 130 in the tube 60 comes in line with the sleeve port 128 connected to the vacuum tube 126. The interior of the tube 60 has a passage 132 communicating with the interior of a rubber inner cup 134 located within the suction cup 50. Accordingly, when the suction cup 50 is in the position shown in phantom line in FIG. 9, a vacuum is created between the inner cup 134 and the engaged cap 47 providing an effective engagement therewith. As the inner cup 134 is made of resilient material, the cup 50 also acts as a guide to provide proper alignment of a cap 47 with the holding ring 31.

As the suction cup 50 begins its return movement with a cap 47 securely engaged thereby, the disc 120 again moves along with the support tube 60. When the cap 47 is engaged by the pawls 106, a stop post 136 mounted on the disc 120 engages a fixed projection 138 on the pedestal 42a thereby preventing further downward movement of the disc 120. The support tube 60 then begins to slide downwardly within the sleeve 124 so that the port 130 is again closed. As the downward movement of the tube 60 continues, a port 140 in the tube 60 is uncovered thereby subjecting the passage 116 to atmospheric pressure. A plurality of O-rings 142 are provided as a seal and to insure a snug fit between the sleeve 124 and the support tube 60.

Overload Trip

At times, certain of the containers move along the conveyor 15 conceivably could be misaligned or overloaded due to the malfunctioning of the feed through the container loading tube 19 from the supply 27. Should the latter event occur, it would be apparent that problems of a serious nature can arise if efforts are made to discharge the caps held within the ringlike member 31 on the drum 28. This would be because of the fact that when the caps are forced downwardly over the container tops by the action of the discharge cup 52 being moved downwardly by the described linkage, either the oversupply of container content would preclude the lids being fitted tightly into the container or, with a substantial excess loading, the supply of material within the container might be forced outwardly therefrom. This would, of course, tend to upset the operation and the container contents would be spilled over the conveyor belt.

To preclude the above possibility and other possible malfunctions, the fixed pin 82 rotatably supporting the forked arm 80, has a spring loaded mounting that is adapted to actuate a relay switch which arrests the drive of the container loading apparatus. As illustrated in FIGS. 3 and 4, the pin 82 is attached at its opposite ends to suitable collars 150 which are supported by a mounting frame 152. A pair of spring loaded fastening members 154 having spring elements 155, are mounted on each side of the forked arm 80 and secure the frame 152 to the housing 42, but allow the frame 152 to move away from the housing 42 a small distance against the bias of the spring elements 155. Under normal operating conditions, the fastening members 154 hold the frame 152 and consequently the pivot pin 82 for the forked arm 80 in the position illustrated in FIG. 4.

When a malfunction occurs impeding the downward stroke of the discharge cup 52, the force transmitted through the forked arm 80 to the pin 82 by the drive shaft 43a, moves the collars 150 and the frame 152, a small distance to the right as viewed in FIG. 4. Such movement of the frame 152 causes an arrest of the apparatus drive in the following manner. A relay switch 156 having an electrical contact element 158 along the outer edge thereof is electrically connected to the apparatus drive. The apparatus drive is adapted to be stopped in a conventional manner upon the actuation of the relay switch 156. The mounting frame 152 has an L-shaped contact bar 160, which terminates in a contact element 162 normally engaged with the element 158. An electric circuit (not shown) is completed between the L-shaped contact bar and the relay switch 156 when the elements 158 and 162 are engaged. However, if the frame 152 moves outwardly because of a malfunction, the circuit is broken thereby actuating the relay switch 156 and arresting the apparatus drive. The drive can be restarted in any suitable fashion, but the initial breaking of the contact is sufficient to open a relay (not shown) which must be manually reconnected in any desired and suitable fashion to reinstate the operation.

The discharge cup 52 is mounted on the lower frame 58 in a manner which will accommodate slight overtravel of the forked arm 80, minor overloading of the container 17 and also to insure a firm engagement of the caps 47 within containers 17, without actuating the relay switch 156. To accomplish this, as illustrated in FIG. 6, the support shaft 62b is slidably mounted in the collar 58b of the lower frame 58. A spring 64, engaged with the collar 58b on one end, biases the discharge cup 52 downwardly. The shaft 62b is supported against the downward bias of the spring 64 by a washer 65 engaged with the upper surface of the collar 58b and nut 66 fastened to the upper end of the shaft 62b. Upon downward movement of the cap 52 to the position shown in phantom line in FIG. 6 where the discharge cup 52 presses a cap 47 onto a container 17, slight overtravel in the forked arm 80 or minor overloading of the container 17 is compensated for when the shaft 62b slides upwardly within the collar 58b against the bias of the spring 64 thereby preventing the actuation of the relay switch 156.

It will be understood that various changes in the details, materials and arrangements of parts, which have been herein described and illustrated in order to explain the nature of the invention, may be made by those skilled in the art within the principle and scope of the invention.

We claim:

1. Apparatus for covering loaded containers in sequence as they progressively are moved along by a conveyor including container cup supply means positioned above the conveyor, cap transfer means located adjacent to both the cap supply means and to the conveyor transporting the loaded containers, pickoff means provided by the transfer means for removing covers individually from the supply means and then moving them to holding elements located on the transfer mechanism for subsequent transfer and release in a planar position substantially parallel to the conveyor, discharge means operating concurrently with said pickoff means for removing previously held container caps from the holding elements positioned over the conveyor and then pressing the caps onto the loaded containers.

2. The apparatus of claim 1 wherein said holding elements each have a holding ring with a plurality of spring loaded pawls for gripping the container cap.

3. A container capping mechanism for use with a conveyor transporting loaded containers in sequence in step-by-step fashion between a loading point and a discharging point with the container capping mechanism positioned between the two points, the capping mechanism including container cap supply means, a transfer drum having a plurality of support surfaces, a plurality of container cap holding means mounted on said support surfaces of said transfer drum, said cap holding means each having a generally planar holding ring with an annular seat for receiving the container caps, drive means for turning the transfer drum in a step-by-step fashion at a turning speed coordinated with the step-by-step movement of the conveyor so that at any arrested position of the conveyor movement one planar holding ring on said transfer drum is positioned directly over and substantially parallel to the loaded container conveyor and another planar holding ring on said transfer drum is positioned directly beneath the container cup supply means, pickoff means for transferring container caps individually from the supply means to said holding rings on said drum, said holding rings having a plurality of movable elements establishing a securement of the caps on said drum, discharge means for removing a previously gripped cap from one of said holding rings which at the removal time is turned to a position adjacent the loaded container and for forcing the removed cover into secure engagement with the container as a top covering therefor, and operating means simultaneously driving said pickoff means and said discharge means.

4. The mechanism of claim 3 wherein a linkage between said pickoff means and said discharge means establishes the simultaneous movement therebetween.

5. The mechanism of claim 4 wherein said operating means has a cam member controlling the timing of the simultaneous pickup and discharge movement.

6. The mechanism of claim 5 wherein vacuum means is provided on said pickoff means for effectively gripping container cups.

7. The mechanism of claim 6 wherein said cap pickoff means has a substantially conical member adapted for contacting the flat surface of a container cap and wherein said vacuum means is connected to supply reduced pressure internally of the conical member during limited time periods to provide for effective cap removal from the supply means.

8. The mechanism of claim 7 wherein a disc mounted on said pickoff means has pins aligned to set said movable elements on said holding rings in the open position, and control means for supplying reduced pressure to said conical member.

9. The mechanism of claim 8 wherein said holding rings have a washerlike base and a cylindrical rim portion formed on the inner periphery of said base portion and extending inwardly towards the interior of said drum, said base portion being fastened to said support surface of said drum, said rim portion having a plurality of lip portions extending radially inwardly, the inner cylindrical surface of said rim portion and said lip portion forming an annular seat for receiving a container cap, and wherein said elements are a plurality of movable pawls rotatably mounted on said rim in radial slots which extend inwardly from the inner periphery of said base and said rim, said pawls having a generally U-shaped portion for engaging the container lids and being spring biased whereby they remain set in an open or closed position.

10. A holding ring mechanism for holding container caps in a releasable manner for selected periods of time, said mechanism having a ring structure providing an internal annular seat for receiving container caps, a plurality of biased gripping elements pivotally mounted at circumferentially spaced locations on said ring structure and movable into open and closed positions, said gripping elements having portions extending over said annular seat in the closed position hereof to releasably hold a container cap in the annular seat provided by the ring and in an open position to guide the cap internally of the annular ring.

11. The mechanism of claim 10 wherein said annular ring structure comprises a washerlike base and a cylindrical rim portion extending in a perpendicular direction to the plane of the base, and lip portions extending radially inwardly from the cylindrical rim portion, the inner cylindrical surface of said rim portion and said lip portions forming an annular seat for receiving a container cap, and wherein said gripping elements are a plurality of pawls pivotally mounted in radial slots extending inwardly from the inner periphery of said base and rim.

12. The mechanism of claim 11 wherein said pawls have a U-shaped gripping portion, said U-shaped portion having a flange which is contacted by a cap entering the annular seat when the said pawls are in the open position, the engagement of the cap with said flange causing said pawls to rotate and move to the closed position, said U-shaped gripping portion having a retaining finger portion disposed in opposing relationship to said flange portion which extends over said annular seat in the closed position of said pawls to hold a cap therein.

13. The mechanism of claim 11 wherein a resilient member circumferentially surrounds the outer periphery of said cylindrical rim and biases said pawls into a set position.

14. The mechanism of claim 13 wherein said pawls have elongated bores for receiving fixed mounting pins rotatably supports said pawls on said annular ring, said resilient means normally biasing said pawls toward the radially outer end of said bores, said pawls being movable radially outwardly relative to said annular ring against the bias of said resilient means to accommodate oversize caps.

15. A container capping mechanism for use in sequential capping of loaded containers which are moved under the capping apparatus including a housing for mounting the apparatus, a pedestal fixedly mounted on said housing and extending outwardly therefrom, a drum rotatably mounted on said pedestal, drive means for rotating said drum in a step-by-step manner, a plurality of cap holding ring means mounted on said drum in aligned relationship, pickoff means movably mounted on said pedestal and operable when the rotation of said drum is arrested to pass through one of said rings to pickoff a container cap from a supply source and transfer the container cap to the holding ring on said drum; and discharge means movably mounted on said pedestal and operable simultaneously with said pickoff means to pass through a holding ring having a previously gripped cap, disengaging the cap from said holding ring and pressing the cap into engagement with a container positioned under the capping apparatus; an operating means for simultaneously driving the pickoff means and said discharge means.

16. The mechanism of claim 15 wherein said pedestal has a plurality of fixed posts, an upper support member slidably mounted on the posts above the pedestal, a lower support slidably mounted on the posts below the pedestal, said pickoff means including a suction cup mounted on said upper support and said discharge means including a discharge cup mounted on said lower support.

17. The mechanism of claim 16 wherein said upper and lower supports are operably connected by a linkage mechanism and wherein said lower support is operably connected to a forked driving member, said forked driving member being pivoted by cam means to cause said suction cup and said discharge cup to pass through said rings when the movement of said drum is arrested.

18. The mechanism of claim 17 wherein said holding rings have a washerlike base and a cylindrical rim portion formed on the inner periphery of said base portion and extending inwardly towards the interior of said drum, said base portion being fastened to said support surface of said drum, said rim portion having a plurality of lip portions extending radially inwardly, the inner cylindrical surfaces of said rim portion and said lip portion forming an annular seat for receiving a container cap, and wherein said movable elements are a plurality of pawls rotatably mounted on said rim in radial slots which extend inwardly from the inner periphery of said base and said rim, said pawls having a generally U-shaped portion for engaging the container lids and being spring biased whereby they remain set in an open or closed position.

\* \* \* \* \*